US012781892B2

(12) United States Patent
Staton

(10) Patent No.: US 12,781,892 B2
(45) Date of Patent: Nov. 3, 2026

(54) THERMAL EXPANSION COUPLER

(71) Applicant: BWXT Advanced Technologies LLC, Lynchburg, VA (US)

(72) Inventor: Michael C. Staton, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 19/283,504

(22) Filed: Jul. 29, 2025

(65) Prior Publication Data

US 2026/0036232 A1 Feb. 5, 2026

Related U.S. Application Data

(60) Provisional application No. 63/677,166, filed on Jul. 30, 2024.

(51) Int. Cl.
*F16L 27/12* (2006.01)

(52) U.S. Cl.
CPC .................................... *F16L 27/12* (2013.01)

(58) Field of Classification Search
CPC . F16L 27/12; F16L 27/1275; F16L 27/12751; F16L 27/1012; F16L 27/02; F16L 27/08; F16L 27/127; F16L 39/04; F16L 47/18; F16L 49/08; F16L 51/00; F16L 15/02; F16L 37/50; F16L 37/505
See application file for complete search history.

(56) References Cited

U.S. PATENT DOCUMENTS

| | | | | | |
|---|---|---|---|---|---|
| 336,129 | A * | 2/1886 | McGahan | F16L 27/12 | 285/302 |
| 686,598 | A * | 11/1901 | Evans | F16L 21/04 | 277/621 |
| 2,445,580 | A * | 7/1948 | Kasten | F16L 27/12751 | 285/31 |
| 2,497,987 | A * | 2/1950 | Goode | F16L 15/02 | 285/354 |

(Continued)

OTHER PUBLICATIONS

International Search Report and Written Opinion for International Application No. PCT/US2025/039660, dated Dec. 2, 2025, 13 pages.

(Continued)

*Primary Examiner* — Aaron M Dunwoody
(74) *Attorney, Agent, or Firm* — Nelson Mullins Riley & Scarborough LLP

(57) ABSTRACT

An expansion coupler locatable between a first pipe and a second pipe has a tubular member defining a flow path. First and second telescopic members are located external to the tubular member. A portion of the first telescopic member axially overlaps a portion of the second telescopic member. At least one of the first telescopic member and the second telescopic member is axially movable with respect to the other of the first telescopic member and the second telescopic member over a range. Seals are provided to inhibit passage of fluid between the inside of the expansion coupler and the ambient environment. A preload arrangement is connected between the first telescopic member and the second telescopic member, the preload arrangement providing a preload force against axial contraction of the expansion coupler.

20 Claims, 5 Drawing Sheets

(56) References Cited

U.S. PATENT DOCUMENTS 3,212,798 A * 10/1965 Lewis .................... F16L 49/04
285/911
3,458,219 A * 7/1969 Wesch .................... F16L 47/14
285/364
4,087,323 A * 5/1978 Sullivan ................ F16L 27/026
976/DIG. 11
4,239,266 A * 12/1980 Mynhier ............... F16L 21/007
285/348
4,249,786 A * 2/1981 Mahoff ................... F16L 23/04
24/24
4,317,586 A * 3/1982 Campbell ............. F16L 27/023
285/302
4,482,171 A * 11/1984 Campbell ........... F16L 27/1275
285/900
5,584,511 A 12/1996 Gonzalez et al.
5,639,127 A * 6/1997 Davey ................. F01N 13/1811
285/226
6,929,287 B2 * 8/2005 Flindall ................. F16L 23/036
285/95
7,563,100 B1 7/2009 Smith
10,948,113 B1 * 3/2021 Robertson ............... F16L 15/02
2003/0217778 A1 * 11/2003 Challender .......... B64D 37/005
138/114
2004/0239117 A1 12/2004 Gill
2006/0283606 A1 * 12/2006 Partouche ............... F16L 15/02
166/242.6
2013/0175038 A1 * 7/2013 Conrad ................... E21B 34/14
166/308.1
2015/0121715 A1 * 5/2015 Houser ................... D06F 58/20
34/235
2018/0224030 A1 8/2018 Clapper et al.
2019/0128454 A1 * 5/2019 Chirko .............. F16L 27/12751
2021/0356062 A1 * 11/2021 Vila ...................... F16L 27/113
2023/0066673 A1 * 3/2023 Klose .................. F16L 27/1012
2024/0093814 A1 * 3/2024 Mayer ..................... F16L 25/01

OTHER PUBLICATIONS https://www.smalley.com/retaining-rings/laminar-seal-rings.

* cited by examiner

THERMAL EXPANSION COUPLER

CROSS-REFERENCE TO A RELATED APPLICATION

This application is based upon and claims the benefit of U.S. provisional application No. 63/677,166, filed Jul. 30, 2024, which is incorporated by reference herein in its entirety for all purposes.

GOVERNMENT SUPPORT CLAUSE

This invention was made with Government support under Agreement No. HQ00342090012, awarded by Washington Headquarters Services Acquisition Directorate (WHS/AD) on behalf of the Strategic Capabilities Office (SCO). The Government has certain rights in the invention.

FIELD OF THE INVENTION

The present invention relates to a thermal expansion coupler connecting two sections of pipe together.

BACKGROUND OF THE INVENTION

A thermal expansion coupler allows for axial expansion between two sections of pipe to limit transmitted loads.

Various types of axially expandable connectors have been provided for connections between two sections of pipe. Such connectors may have telescoping sections equipped with seals (e.g., O-rings, metallic rings such as labyrinth seals, etc.) to inhibit loss of fluid in the pipes (or ingress of ambient gas). Connectors with telescoping sections, however, are not generally suitable for high pressure and/or high temperature applications.

Other expandable connectors utilize a cylindrical bellows between connection flanges. Such bellows are commonly used to maintain gas seals while accommodating thermal expansion/contraction. The bellows design, however, creates flow losses and allows a relatively small amount of axial movement. As a result, relatively larges loads can still be transmitted to connected components.

Slip-type expansion joints are also known utilizing flexible graphite packing for sealing between pipe segments. These devices are intended only for low pressure and low temperature applications.

The present invention recognizes and addresses considerations of prior art constructions and methods.

SUMMARY OF THE INVENTION

One aspect of the present invention provides an expansion coupler locatable between a first pipe and a second pipe. The coupler comprises a tubular member defining a flow path in an axial direction. A first telescopic member is located external to the tubular member and defines a first end of the expansion coupler. A second telescopic member is located external to the tubular member and defines a second end of the expansion coupler. A portion of the first telescopic member axially overlaps a portion of the second telescopic member. At least one of the first telescopic member and the second telescopic member is axially movable with respect to the other of the first telescopic member and the second telescopic member over a range (thus varying a distance between the first end of the expansion coupler and a second end of the expansion coupler).

The expansion coupler according to this aspect further includes at least one first seal located between an outer surface of the tubular member and an inner surface of the first telescopic member. At least one second seal is located between an outer surface of the tubular member and an inner surface of the second telescopic member. A preload arrangement is connected between the first telescopic member and the second telescopic member, the preload arrangement providing a preload force against axial contraction of the expansion coupler.

In some exemplary embodiments, the preload arrangement may comprise a plurality of angularly spaced spring sets. For example, each of the spring sets may include at least one spring interposing opposed first and second flanges of the first and second telescoping members, respectively.

In some exemplary embodiments, each of the spring sets may comprise at least three springs, e.g., at least three helical springs. An elongate fastener may extend through the at least three springs and aligned holes in opposed first and second flanges of the first and second telescopic members, respectively.

In some exemplary embodiments, at least one third seal may be located between an inner surface of the first telescopic member and an outer surface of the second telescopic member. A port may be provided, in selective fluid communication with a sealed space defined by the first seal, the second seal, and the third seal.

In some exemplary embodiments, the first telescopic member may have a first connection flange at the first end of the expansion coupler and the second telescopic member may have a second connection flange at a second end of the expansion coupler.

Another aspect of the present invention provides a method comprising providing an expansion coupler. The expansion coupler according to this aspect includes a tubular member defining a flow path in an axial direction. A first telescopic member is located external to the tubular member and defines a first end of the expansion coupler. A second telescopic member is located external to the tubular member and defines a second end of the expansion coupler. A portion of the first telescopic member axially overlaps a portion of the second telescopic member, at least one of the first telescopic member and the second telescopic member is axially movable with respect to the other of the first telescopic member and the second telescopic member over a range.

Another step of the method involves connecting a preload arrangement between the first telescopic member and the second telescopic member. A still further step involves adjusting the preload arrangement to provide a predetermined preload force that opposes contraction of the expansion coupler.

A further aspect of the present invention provides an expansion coupler locatable between a first pipe and a second pipe. The coupler comprises a tubular member defining a flow path in an axial direction. A first telescopic member is located external to the tubular member and defines a first end of the expansion coupler. A second telescopic member is located external to the tubular member and defines a second end of the expansion coupler. A portion of the first telescopic member axially overlaps a portion of the second telescopic member, at least one of the first telescopic member and the second telescopic member being axially movable with respect to the other of the first telescopic member and the second telescopic member over a range.

According to this aspect, at least one first seal is located between an outer surface of the tubular member and an inner surface of the first telescopic member. In addition, at least one second seal is located between an outer surface of the tubular member and an inner surface of the second telescopic member. Moreover, at least one third seal is located between an inner surface of the first telescopic member and an outer surface of the second telescopic member. A port is in selective fluid communication with a sealed space defined by the first seal, the second seal, and the third seal.

The accompanying drawings, which are incorporated in and constitute a part of this specification, illustrate one or more embodiments of the disclosure and, together with the description, serve to explain the principles of the invention.

BRIEF DESCRIPTION OF THE DRAWINGS

A full and enabling disclosure of the present invention, directed to one of ordinary skill in the art, is set forth in the specification, which makes reference to the appended drawings, in which.

Figure 1:
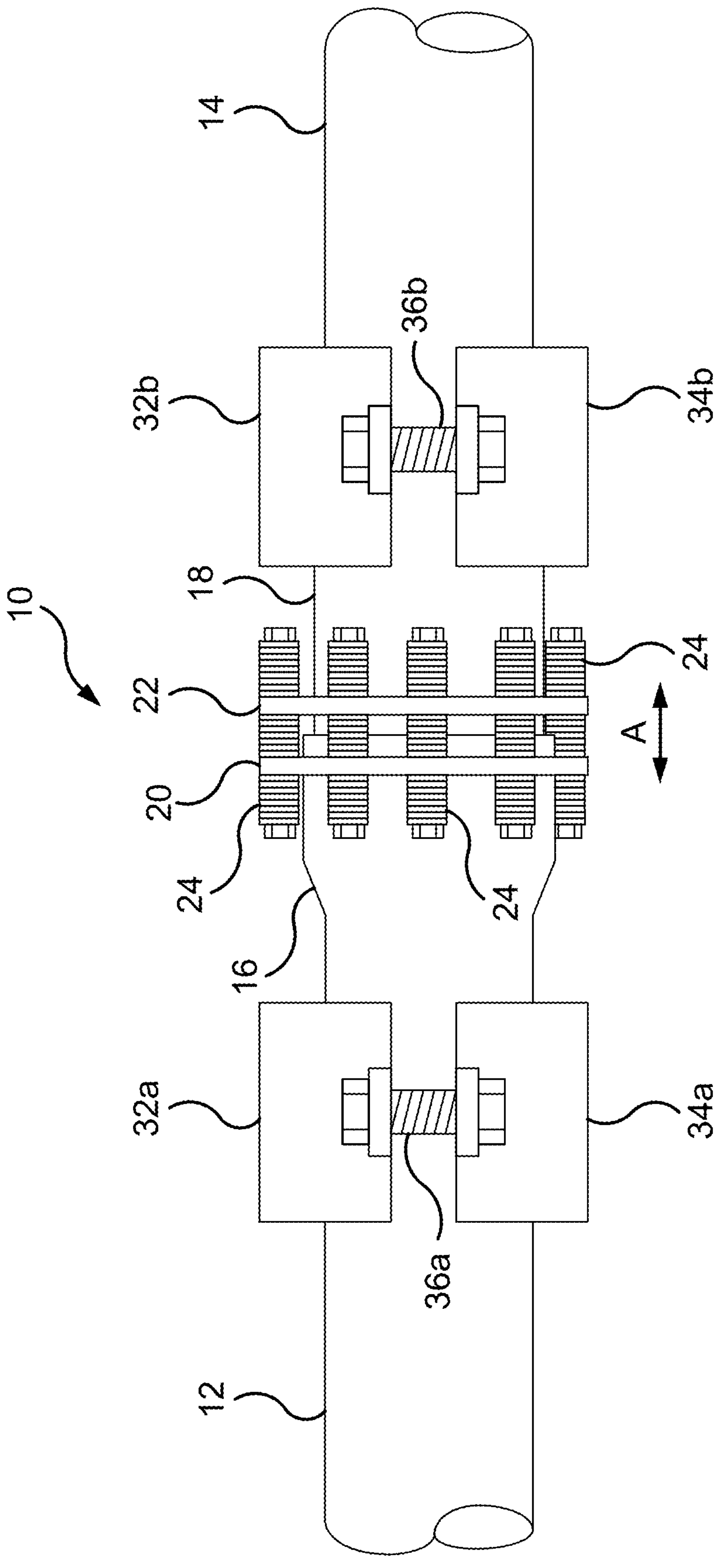
FIG. 1 is a diagrammatic representation showing a thermal expansion coupler in accordance with an embodiment of the present invention positioned between two sections of pipe.

Repeat use of reference characters in the present specification and drawings is intended to represent same or analogous features or elements of the invention according to the disclosure.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims.

FIG. 1 illustrates an embodiment of a thermal expansion coupler 10 constructed in accordance with an embodiment of the present invention. As shown, coupler 10 is connected between a first pipe 12 and a second pipe 14 to allow flow of fluid, e.g., high temperature gas under high pressure, to flow between pipes 12 and 14. As indicated by arrow A, coupler 10 allows axial contraction and expansion of the pipes 12 and 14 over a predetermined range (axial distance) without transmission of significant axial loads. Moreover, as will be apparent from the description below, the design of coupler 10 provides no more than insignificant flow losses as the fluid passes through it.

Coupler 10 has outer and inner telescopic members 16 and 18 that allow the axial movement. Specifically, telescopic members 16 and 18 are able to move slidably with respect to one another as axial contraction and expansion of the pipes 12 and/or 14 occurs. Telescopic members 16 and 18 may have respective flanges 20 and 22 at an intermediate location on coupler 10 that oppose one another. In this embodiment, the flanges are interconnected by a preloading arrangement (here in the form of a plurality of angularly spaced spring sets 24) explained more fully below.

Figure 2:
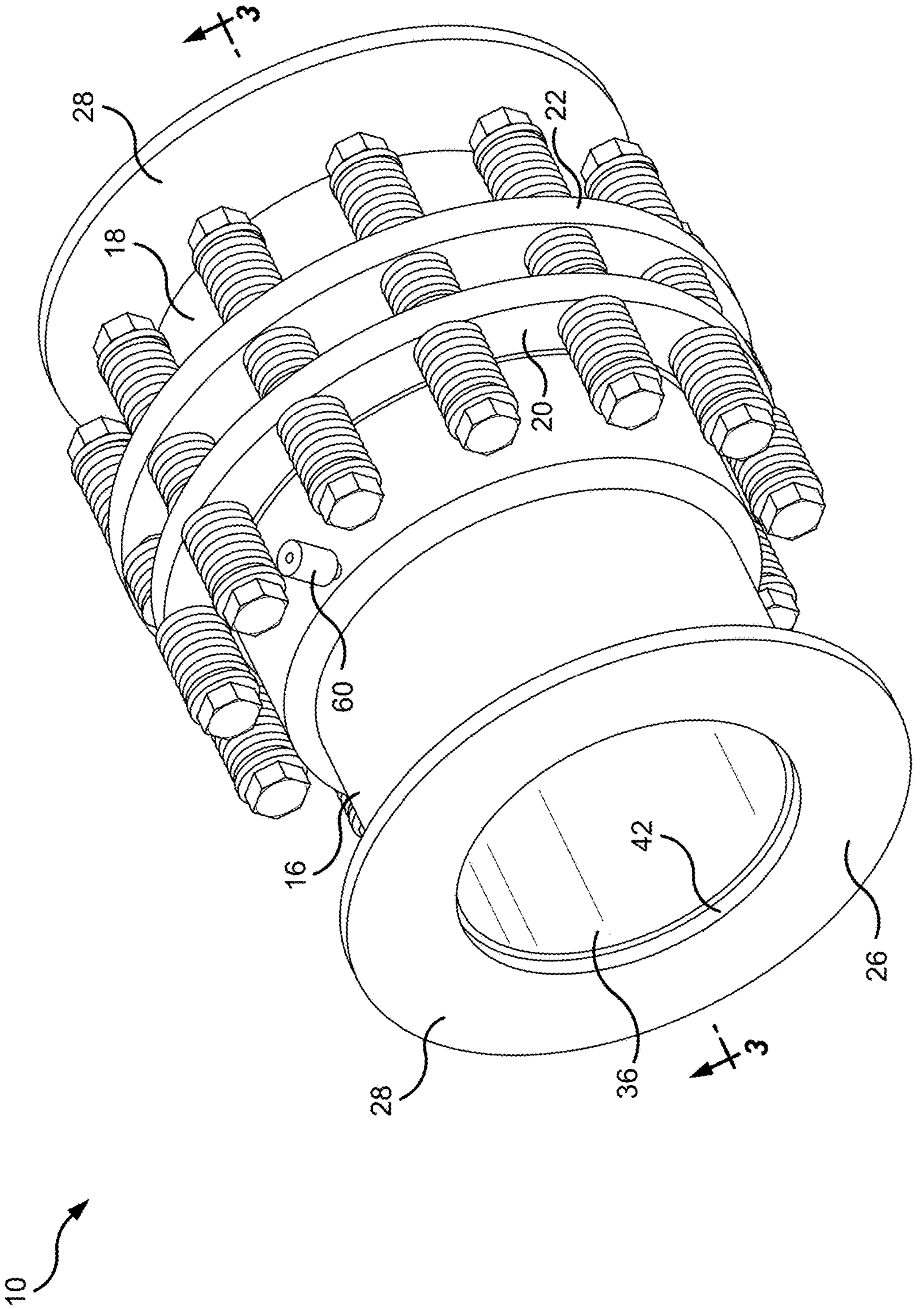
FIG. 2 is an isometric view of a thermal expansion coupler in accordance with an embodiment of the present invention.
Figure 3:
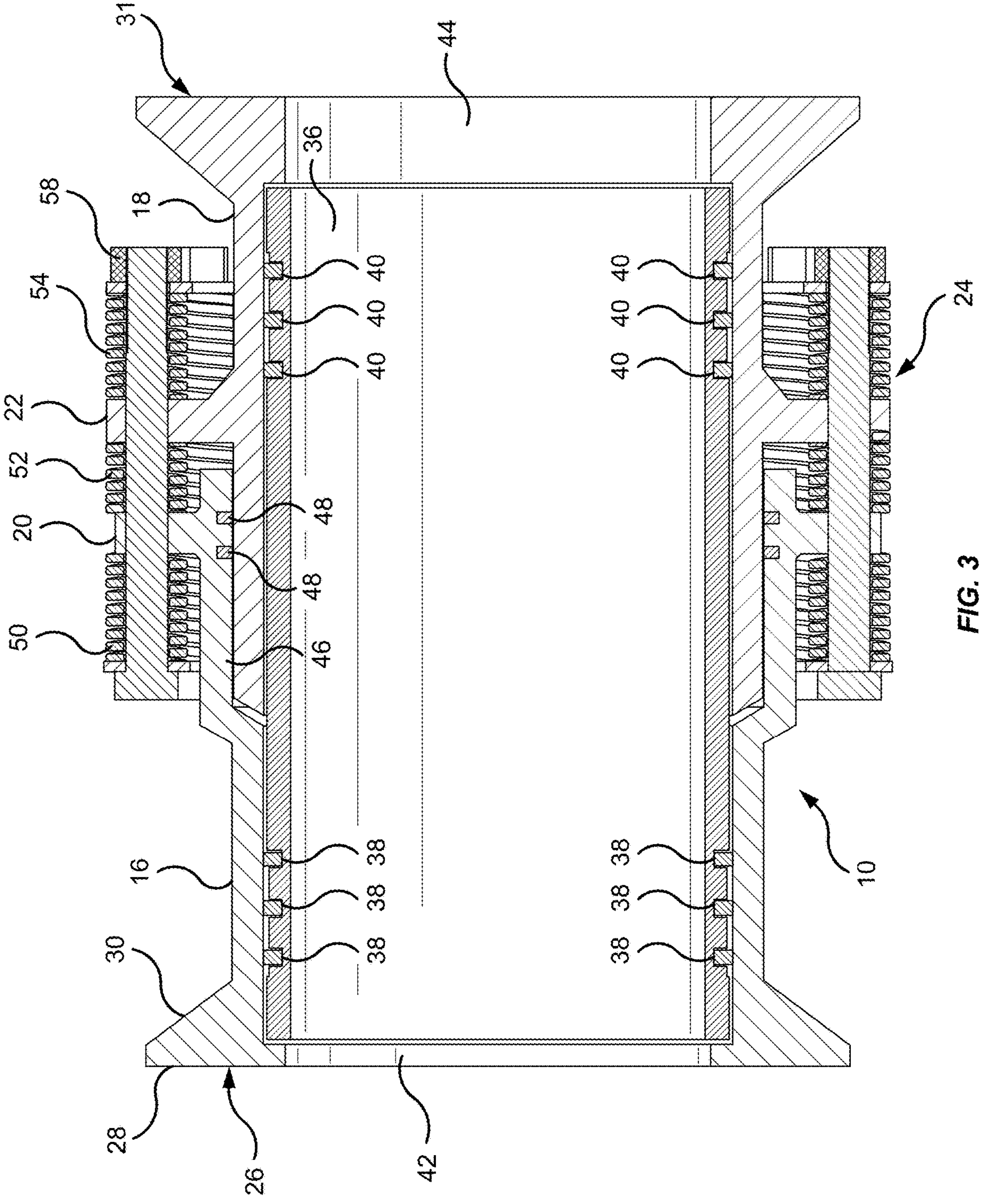
FIG. 3 is a cross-sectional view of the thermal expansion coupler of FIG. 2 taken along line 3-3.

Referring now also to FIGS. 2 and 3, it will be appreciated that the ends of coupler 10 are suitably configured to be sealingly connected to pipes 12 and 14. While permanent, welded in place, connections are contemplated, embodiments of the present invention preferably have removable connections in case it is necessary to refurbish or replace coupler 10. In this regard, traditional flanges that mate with similar flanges on pipes 12 and 14 with axial bolts or other suitable mechanical connectors may be utilized. In the illustrated embodiment, however, coupler 10 utilizes "Grayloc" style connectors.

In this regard, outer member 16 has a flange 26 at its distal end. Flange 26 has a flat end surface 28 for engagement with the end surface of a similar flange on pipe 12. A frustoconical surface 30 is located on the other axial side of flange 26. Flange 31 of inner member 18 has a similar construction. Referring again to FIG. 1, the adjacent flanges of coupler 10 and pipes 12, 14 are moved into sealing engagement by opposed clamps **32*a*-34*a* and 32*b*-34*b* (or other suitable clamping arrangement). Each pair of clamps is tightened by a pair of bolts, such as those shown at 36*a* and 36*b*** (a similar bolt on the opposite side of the pipe is not shown in this view).

Certain internal details of coupler 10 can be most easily described with particular reference to FIG. 3. As shown, coupler 10 includes a tubular member 36 located inside of telescopic members 16 and 18. Tubular member 36 is configured in this case having a substantially cylindrical shape. The smooth inner bore of tubular member 36 provides a minimally disruptive flow path for fluid passing through the coupler 10. A series of seals, indicated at 38 and 40, provide sealing engagement between the outer surface of tubular member 36 and the inner surface of members 16 and 18, respectively, to inhibit escape of flowing fluid. In this embodiment, seals 38 and 40 are configured as piston ring-type seals (solid or helical) seated in annular grooves defined in the outer diameter of tubular member 36. Other suitable seals, such as flexible metal (helicoflex), packed graphite seals, and/or packed fiberglass seals, could be used depending on the intended application.

It can be seen that flanges 26 and 31 have a reduced inner diameter, as indicated at 42 and 44, respectively, compared with the outer diameter of tubular member 36. This facilitates smooth flow into and out of coupler 10, while also retaining tubular member 36 inside of members 16 and 18. In addition, a portion 46 of outer member 16 axially overlaps inner member 18, as shown. If desired, seals 48 may be provided for sealing engagement between the outer diameter of inner member 18 and the inner diameter of outer member 16 (at the overlapping portion 46) to enhance isolation with the ambient environment. In this embodiment, seals 48 are seated in respective annular grooves defined in the inner diameter of outer member 16. Seals 48 may be piston ring-type seals, flexible metal, packed graphite seals, packed fiberglass seals, and/or other suitable annular seals as necessary or desired.

Figure 4:
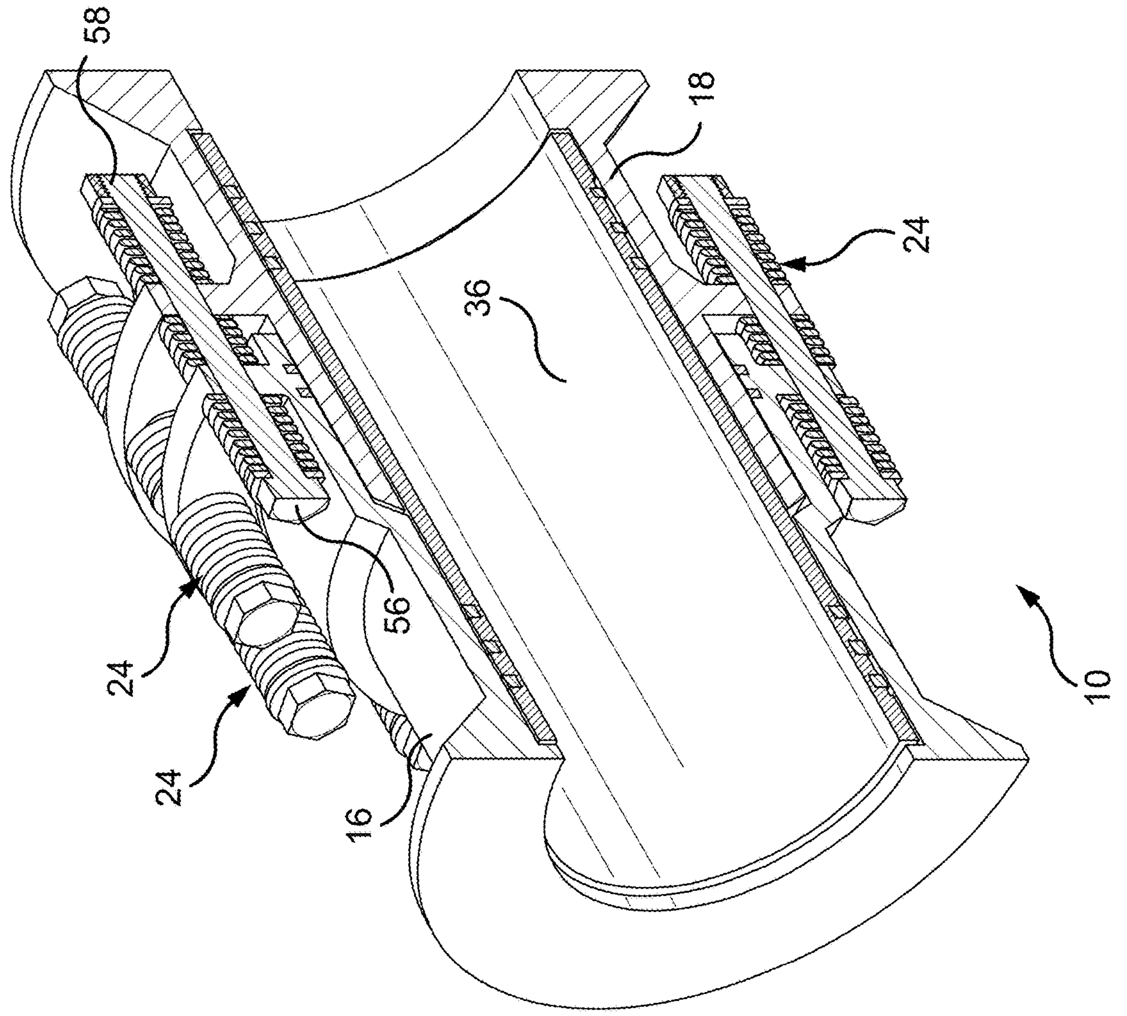
FIG. 4 is an isometric view of the cross-section shown in FIG. 3.

As noted above, a plurality of spring sets 24 interconnect inner member 14 and outer member 16 (via adjacent flanges 20 and 22) in this embodiment. Referring now to FIGS. 3 and 4, each spring set 24 comprises a trio of springs 50, 52, and 54. Any suitable springs may be utilized for this purpose, such as stacked Belleville washers, but helical springs are used in the illustrated embodiment. The length and spring constant of the springs will depend on the particular needs of the application. As can be seen, spring 50 is located outside of flange 20, spring 52 is located between flanges 20 and 22, and spring 54 is located outside of flange 22. The springs are aligned axially with corresponding holes in the flanges 20 and 22. As shown, an elongate fastener extends through spring 50, flange 20, spring 52, flange 22, and spring 54 to retain the combined arrangement 24 in place.

In the present embodiment, the elongate fastener comprises a bolt 56 having a nut 58 threaded onto the end opposite the bolt head. Preferably, the elongate fastener may be adjusted (e.g., tightened) so that the springs are slightly compressed when expansion coupler 10 is in the at rest state. This provides a desired degree of preloading between inner member 16 and outer member 18. Thus, axial contraction of coupler 10 as the pipes get hot will be opposed by the preloading force of the combined arrangements 24. This lowers the overall force that is transmitted from one pipe to the other.

Figure 5:
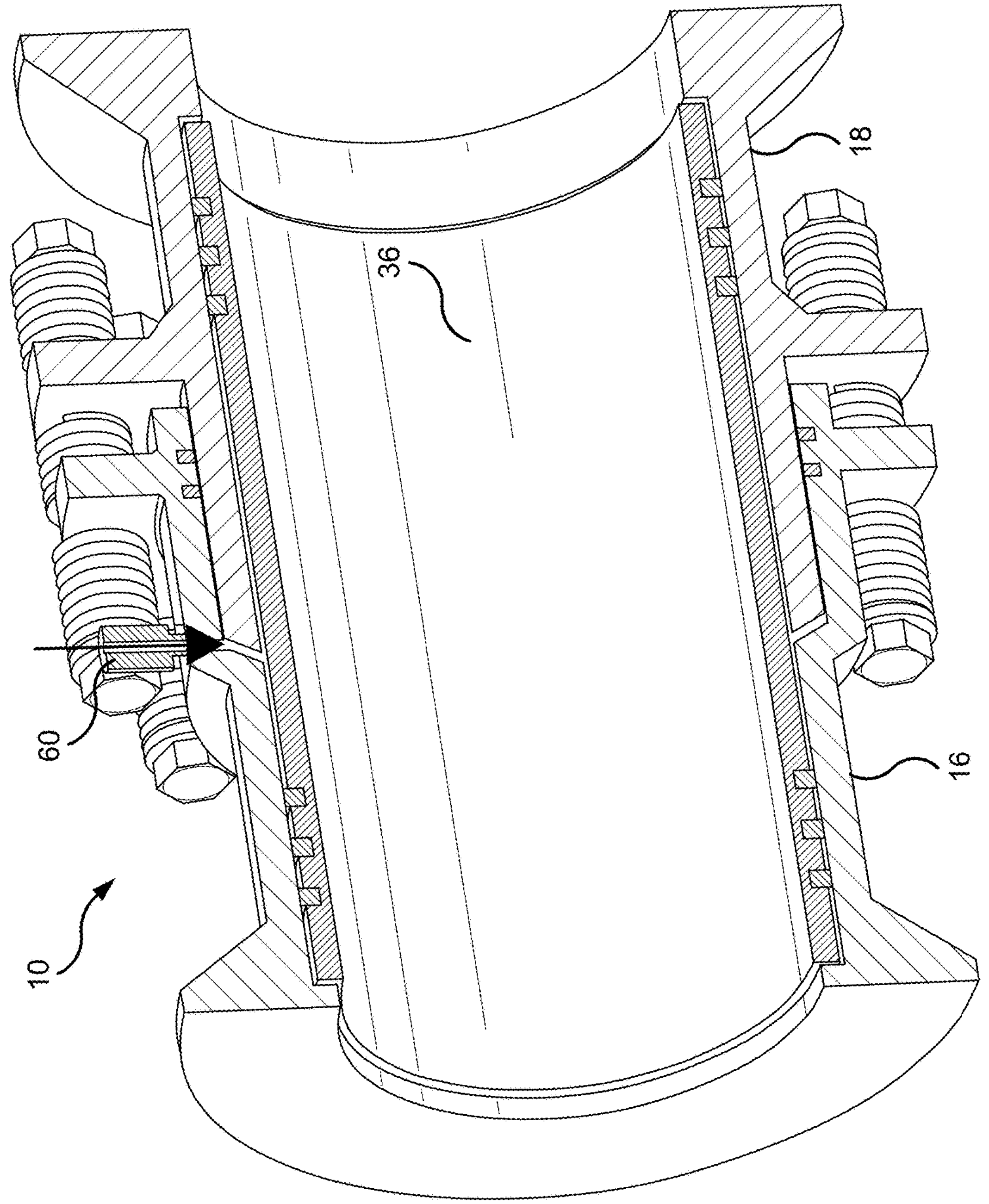
FIG. 5 is an isometric view similar to FIG. 4 but showing introduction of gas into an area between fluid (inner) and environmental (outer) seals to reduce a pressure differential between the sealed space and the interior of the piping.

Referring now to FIG. 5, a suitable port 60 may be provided to allow introduction of back pressure into the sealed space between inner member 16, outer member 18, and tubular member 36. In this embodiment, port 60 is in the form of a one-way valve (such as a Shrader valve) through which a quantity of suitable gas can be introduced (as indicated). It will be appreciated that the introduced gas will have a pressure greater than ambient. This reduces the pressure differential between the interior of coupler 10 and the sealed space, thus inhibiting leakage.

One skilled in the art will appreciate that the components of coupler 10 may be made of any suitable materials depending on the requirements of the application. In many cases, for example, inner member 16, outer member 18, and tubular member 36 may be formed of a suitable grade of stainless steel. In addition, the at rest axial length of coupler 10 and the axial extent of reciprocation may vary as the application requires. It will be appreciated that the disclosed arrangement allows greater axial movement than can be achieved using a bellows-type connector of the prior art, with less flow disruption.

While one or more preferred embodiments of the invention are described above, it should be appreciated by those skilled in the art that various modifications and variations can be made in the present invention without departing from the scope and spirit thereof.

What is claimed is:

1. An expansion coupler locatable between a first pipe and a second pipe, the coupler comprising:

a tubular member defining a flow path in an axial direction;

a first telescopic member located external to the tubular member and defining a first end of the expansion coupler;

a second telescopic member located external to the tubular member and defining a second end of the expansion coupler;

a portion of the first telescopic member axially overlapping a portion of the second telescopic member, at least one of the first telescopic member and the second telescopic member being axially movable with respect to the other of the first telescopic member and the second telescopic member over a range;

at least one first seal located between an outer surface of the tubular member and an inner surface of the first telescopic member;

at least one second seal located between an outer surface of the tubular member and an inner surface of the second telescopic member; and a preload arrangement connected between the first telescopic member and the second telescopic member, the preload arrangement providing a preload force against axial contraction of the expansion coupler.

2. An expansion coupler as set forth in claim 1, wherein the preload arrangement comprises a plurality of angularly spaced spring sets.

3. An expansion coupler as set forth in claim 2, wherein each of the spring sets includes at least one spring.

4. An expansion coupler as set forth in claim 3, wherein the at least one spring of each of the spring sets interposes opposed first and second flanges of the first and second telescoping members, respectively.

5. An expansion coupler as set forth in claim 3, wherein each of the spring sets comprises at least three springs.

6. An expansion coupler as set forth in claim 5, wherein each of the at least three springs comprises a helical spring.

7. An expansion coupler as set forth in claim 5, wherein each of the spring sets comprises an elongate fastener extending through the at least three springs and aligned holes in opposed first and second flanges of the first and second telescopic members, respectively.

8. An expansion coupler as set forth in claim 1, further comprising at least one third seal located between an inner surface of the first telescopic member and an outer surface of the second telescopic member.

9. An expansion coupler as set forth in claim 8, further comprising a port in selective fluid communication with a sealed space defined by the first seal, the second seal, and the third seal.

10. An expansion coupler as set forth in claim 1, wherein the first telescopic member has a first connection flange at the first end of the expansion coupler and the second telescopic member has a second connection flange at a second end of the expansion coupler.

11. An expansion coupler as set forth in claim 1, wherein the first and second telescopic members define respective first and second inwardly directed flanges, the tubular member being axially contained between the first and second inwardly directed flanges.

12. A method comprising:

(a) providing an expansion coupler including:

a tubular member defining a flow path in an axial direction;

a first telescopic member located external to the tubular member and defining a first end of the expansion coupler;

a second telescopic member located external to the tubular member and defining a second end of the expansion coupler;

a portion of the first telescopic member axially overlapping a portion of the second telescopic member, at least one of the first telescopic member and the second telescopic member being axially movable with respect to the other of the first telescopic member and the second telescopic member over a range; and a preload arrangement connected between the first telescopic member and the second telescopic member;

(b) connecting the first telescopic member to a first pipe and the second telescopic member to a second pipe; and (c) adjusting the preload arrangement to provide a predetermined preload force between the first telescopic member and the second telescopic member that opposes contraction of the expansion coupler.

13. A method as set forth in claim 12, wherein the preload arrangement comprises at least one spring and adjusting the preload arrangement involves compressing the at least one spring.

14. A method comprising:

(a) providing an expansion coupler including:

a tubular member defining a flow path in an axial direction;

a first telescopic member located external to the tubular member and defining a first end of the expansion coupler;

a second telescopic member located external to the tubular member and defining a second end of the expansion coupler; and a portion of the first telescopic member axially overlapping a portion of the second telescopic member, at least one of the first telescopic member and the second telescopic member being axially movable with respect to the other of the first telescopic member and the second telescopic member over a range;

(b) connecting a preload arrangement between the first telescopic member and the second telescopic member;

(c) adjusting the preload arrangement to provide a predetermined preload force that opposes contraction of the expansion coupler; and (d) injecting a pressurized fluid into a sealed space defined between the first telescopic member, the second telescopic member, and the tubular member.

15. An expansion coupler locatable between a first pipe and a second pipe, the coupler comprising:

a tubular member defining a flow path in an axial direction;

a first telescopic member located external to the tubular member and defining a first end of the expansion coupler;

a second telescopic member located external to the tubular member and defining a second end of the expansion coupler;

a portion of the first telescopic member axially overlapping a portion of the second telescopic member, at least one of the first telescopic member and the second telescopic member being axially movable with respect to the other of the first telescopic member and the second telescopic member over a range;

at least one first seal located between an outer surface of the tubular member and an inner surface of the first telescopic member;

at least one second seal located between an outer surface of the tubular member and an inner surface of the second telescopic member;

at least one third seal located between an inner surface of the first telescopic member and an outer surface of the second telescopic member; and a port in selective fluid communication with a sealed space defined by the first seal, the second seal, and the third seal.

16. An expansion coupler as set forth in claim 15, further comprising a preload arrangement having a plurality of angularly spaced spring sets connected between the first telescopic member and the second telescopic member, the preload arrangement providing a preload force against axial contraction of the expansion coupler.

17. An expansion coupler as set forth in claim 16, wherein at least one spring of each of the spring sets interposes opposed first and second flanges of the first and second telescoping members, respectively.

18. An expansion coupler as set forth in claim 17, wherein each of the spring sets comprises at least three springs.

19. An expansion coupler as set forth in claim 18, wherein each of the spring sets comprises an elongate fastener extending through the at least three springs and aligned holes in opposed first and second flanges of the first and second telescopic members, respectively.

20. An expansion coupler as set forth in claim 15, wherein the first and second telescopic members define respective first and second inwardly directed flanges, the tubular member being axially contained between the first and second inwardly directed flanges.

* * * * *